US004001582B2

United States Statutory Invention Registration [19]

[11] Reg. Number: H1582

Bish et al.

[45] Published: Aug. 6, 1996

[54] PROCESS FOR PREPARATION OF CHLORINATED AND CHLOROSULFONATED OLEFIN POLYMERS HAVING LOW LEVELS OF RESIDUAL MONOFLUOROBENZENE REACTION SOLVENT AND ITS CHLORINATED BY-PRODUCTS

[75] Inventors: Christopher J. Bish, Chancy, Switzerland; Edward G. Brugel, Wilmington, Del.; Royce E. Ennis, Silsbee; Jerry W. Soape, Beaumont, both of Tex.

[73] Assignee: E. I. Du Pont de Nemours and Company, Wilmington, Del.

[21] Appl. No.: 260,123

[22] Filed: Jun. 15, 1994

Related U.S. Application Data

[63] Continuation-in-part of Ser. No. 85,527, Jun. 30, 1993, abandoned.

[51] Int. Cl.[6] ..... C08L 23/28; C08L 23/34

[52] U.S. Cl. ..... 525/344

[58] Field of Search ..... 525/344; 425/205, 425/203

[56] References Cited

U.S. PATENT DOCUMENTS

| | | | |
|---|---|---|---|
| 4,544,709 | 10/1985 | Narui et al. | 525/344 |
| 4,663,396 | 5/1987 | Nakagawa et al. | 525/344 |
| 5,214,107 | 5/1993 | Brugel | 525/344 |

FOREIGN PATENT DOCUMENTS

| | | |
|---|---|---|
| 57-047303 | 3/1982 | Japan . |
| 57-123201 | 7/1982 | Japan . |
| 60-001206 | 1/1985 | Japan . |
| 60-149604 | 8/1985 | Japan . |
| 60-192730 | 10/1985 | Japan . |
| 61-120809 | 6/1986 | Japan . |
| 61-123604 | 6/1986 | Japan . |
| 61-130307 | 6/1986 | Japan . |
| 5-140215 | 6/1993 | Japan . |
| 5-140219 | 6/1993 | Japan . |

OTHER PUBLICATIONS

Edward G. Brugel, "Process for Isolation of Low Molecular Weight Chlorinated and Chlorosulfonated Resins", U.S. Patent Appln. Ser. No. 07/979,109, filed Nov. 20, 1992 (Docket No. AD-6077).

*Primary Examiner*—Charles T. Jordan
*Assistant Examiner*—Meena Chelliah

[57] ABSTRACT

Non-discolored chlorinated and chlorosulfonated olefin polymers having low levels of residual solvent are prepared in a process wherein monofluorobenzene is used as a reaction medium and isolation of the polymer is by means of a series of vented closed loop extruders. The process also results in suppression of the formation of monochloromonofluorobenzene as a by-product.

17 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR PREPARATION OF CHLORINATED AND CHLOROSULFONATED OLEFIN POLYMERS HAVING LOW LEVELS OF RESIDUAL MONOFLUOROBENZENE REACTION SOLVENT AND ITS CHLORINATED BY-PRODUCTS

RELATED APPLICATION

This application is a continuation-in-part of copending U.S. patent application Ser. No. 08/085,527, filed Jun. 30 1993, now abandoned.

This invention relates to preparation of chlorinated and chlorosulfonated olefin polymers having low levels of residual monofluorobenzene solvent and solvent by-products.

Chlorinated and chlorosulfonated olefin polymers are widely available materials which find use as general purpose elastomers, coating compositions, and adhesives. The chlorinated polymers are prepared on a commercial scale by reaction of chlorine with olefin polymers either in solution or in aqueous suspension, while the chlorosulfonated analoges are prepared by reaction of olefin polymers with chlorine and either sulfuryl chloride or sulfur dioxide in solution. Other preparative processes have also been disclosed, for example reactive extrusion, chlorination, and chlorosulfonation of solvent-swollen ethylene polymers in aliphatic fluorocarbons having 1–4 carbon atoms, and chlorination and chlorosulfonation in perfluorinated alkane, perfluorinated ether, or perfluorinated amine slurries.

When solution processes are employed, carbon tetrachloride is the solvent of choice because it easily dissolves the polymeric reactants and chlorinated products, it is stable under chlorination and chlorosulfonation reaction conditions, and it is essentially inert to chlorination. In addition, it has always been readily available. However, because carbon tetrachloride is a suspected carcinogen and, further, because it is postulated that carbon tetrachloride can take part in reactions which deplete stratospheric ozone, its use has been subject to increasingly stringent emission controls. Consequently, the use of carbon tetrachloride on a large scale is undesirable for both safety and environmental reasons as well as for economic reasons.

A variety of alternative halogenated solvents have been suggested, but none of these is a completely acceptable replacement for carbon tetrachloride. For example, the halogenated aliphatic solvents methylene chloride, dichloroethane, trichloroethane, 1,2,3-trichloropropane, 1,1,2,2-tetrachloroethane and chloroform are subject to substantial chlorination under the conditions used for manufacture of chlorinated and chlorosulfonated olefin polymers. In addition, in many cases the chlorinated solvents themselves or their by-products are toxic. In the case of chloroform, further chlorination leads to production of carbon tetrachloride. Chlorofluorocarbons, such as dichlorodifluoromethane or trichlorofluoromethane, are unacceptable because they too are suspected stratospheric ozone depleters. Hydrochlorofluorocarbons, such as trichlorotetrafluoropropane (HCFC-224) and dichloropentafluoropropane, (HCFC-225) undergo chlorination as the chlorine content of the olefin polymer base resin is increased towards 60–70 weight percent, resulting in formation of chlorofluorocarbons.

With respect to halogenated aromatic solvents, the use of such compositions as reaction media has been discouraged in the past because they are difficult to remove from the chlorinated or chlorosulfonated polymer products and they cause color generation and loss of physical properties in the product. For example, it has been disclosed in U.S. Pat. No. 4,544,709 that use of aromatic solvents in the preparation of chlorosulfonated olefin polymers has deleterious effects on the tensile strength of the polymers after vulcanization. In particular, a marked decrease in the tensile strength of cured products was observed even when the reaction medium contained low levels of halogenated aromatic solvent. That is, use of a mixture of halogenated aromatic solvent and carbon tetrachloride wherein the aromatic solvent was present at levels as low as 10 weight percent resulted in significant reductions in tensile strength as compared to products prepared in carbon tetrachloride. Further, most halogenated aromatic solvents are subject to greater or lesser degrees of chlorination. The by-products are usually higher boiling and tend to remain associated with the product after isolation. In addition, if the chlorinated by-products are produced in high concentration, costly separation techniques are required to remove them from the solvent prior to recycle. This represents an economic disadvantage.

Monofluorobenzene has been suggested as a reaction solvent for chlorination and chlorosulfonation reactions, for example in Japanese Patent Application Kokai 60-149604 and U.S. Pat. No. 4,663,396, but it has not been utilized in such processes on a commercial scale because, in addition to the above-described disadvantages of aromatic solvents, the use of monofluorobenzene is hazardous, due to formation of highly flammable vapors when the solvent is heated in the presence of air. The usual method of isolation of chlorinated and chlorosulfonated olefin polymers on an industrial scale is by means of steam heated drum dryers, wherein a heated solution of the polymer is introduced to the nip of a pair of rotating dryers and the solvent is removed by vaporization in air. In the case of monofluorobenzene, this creates an unacceptable flammability hazard.

In order to utilize monofluorobenzene as a reaction solvent for chlorination and chlorosulfonation reactions a method is therefore needed which reduces the flammability hazard, eliminates formation of by-products in the polymer product, reduces chlorination of the reaction solvent, and produces a product having adequate physical properties.

SUMMARY OF THE INVENTION

The present invention provides a safe process for preparation and isolation of chlorinated and chlorosulfonated olefin polymers containing low levels of solvent and by-products, wherein monofluorobenzene is utilized as a reaction solvent. Non-discolored chlorinated and chlorosulfonated olefin polymers are thereby produced, and, in addition, chlorination of the reaction solvent is substantially reduced.

Specifically, the present invention is directed to a process for preparation of chlorinated olefin polymers having low residual solvent content which comprises (a) forming a solution or suspension of an olefin polymer in a solvent consisting essentially of monofluorobenzene having a water content of less than 50 ppm, by bringing together the olefin polymer, a free radical catalyst, the monofluorobenzene, and a chlorinating agent selected from the group consisting of chlorine, sulfuryl chloride, a mixture of chlorine and sulfur dioxide, and mixtures thereof, the water content of the monofluorobenzene being reduced to less than 50 ppm i) prior to introduction to the reactor or ii) in situ, with the proviso that the chlorinating agent is introduced simultaneously with the addition of the free radical catalyst or following addition of the free radical catalyst;

(b) chlorinating the olefin polymer to a level of up to 70 percent chlorine by weight while maintaining a level of free radical catalyst sufficient to suppress chlorination of the monofluorobenzene; and (c) separating the chlorinated olefin polymer and solvent, one from the other, substantially in the absence of oxygen, by means of a series of two or more vented closed-loop extruders, the first extruder having at least twice the cross sectional area of the second;

thereby producing a non-discolored chlorinated olefin polymer having a total residual level of combined monofluorobenzene and chlorinated by-products of monofluorobenzene of less than 0.5 percent by weight.

In a preferred embodiment, the chlorinating agent is also a chlorosulfonating agent, for example sulfuryl chloride, a mixture of sulfuryl chloride and chlorine, a mixture of sulfur dioxide and chlorine, or a mixture of chlorine, sulfuryl chloride and sulfur dioxide. Especially preferred is sulfuryl chloride.

DETAILED DESCRIPTION OF THE INVENTION

According to the process of the present invention olefin polymers are chlorinated or chlorosulfonated in solution or suspension in monofluorobenzene and are isolated substantially in the absence of oxygen by means of a series of extruders to produce chlorinated or chlorosulfonated products having low levels of residual solvent and solvent by-products, in particular less than 0.5 weight percent.

By olefin polymers is meant homopolymers and copolymers of $C_2$–$C_8$ alpha-monoolefins, including graft copolymers. The copolymers may be dipolymers or higher order copolymers, such as terpolymers or tetrapolymers. Particularly useful examples include homopolymers of $C_2$–$C_3$ alpha monoolefins, copolymers of ethylene and carbon monoxide, and copolymers of ethylene and at least one ethylenically unsaturated monomer selected from the group consisting of $C_3$–$C_{10}$ alpha monoolefins, $C_1$–$C_{12}$ alkyl esters of unsaturated $C_3$–$C_{20}$ monocarboxylic acids, unsaturated $C_3$–$C_{20}$ mono-or dicarboxylic acids, anhydrides of unsaturated $C_4$–$C_8$ dicarboxylic acids, and vinyl esters of saturated $C_2$–$C_{18}$ carboxylic acids. Specific examples of these polymers include polyethylene, polypropylene, ethylene vinyl acetate copolymers, ethylene acrylic acid copolymers, ethylene methacrylic acid copolymers, ethylene methyl acrylate copolymers, ethylene methyl methacrylate copolymers, ethylene nbutyl methacrylate copolymers, ethylene glycidyl methacrylate copolymers, graft copolymers of ethylene and maleic anhydride, graft copolymers of propylene and maleic anhydride, and copolymers of ethylene with propylene, butene, 3-methyl-l-pentene, hexene, or octene. Preferred olefin polymers are polyethylene, ethylene propylene copolymers, ethylene butene copolymers, ethylene octene copolymers, copolymers of ethylene and acrylic acid, copolymers of ethylene and methacrylic acid, and copolymers of ethylene and vinyl acetate. The olefin polymers have number average molecular weights within the range of 1,000 to 300,000.

The first step of the process of the present invention is carried out by dissolving or suspending an olefin polymer in monofluorobenzene having a water content of less than 50 ppm in a reactor in the presence of a free radical catalyst. Preferably the reactor is glass-lined. When the conditions of the process of the present invention are employed, the utility of monofluorobenzene as a solvent for chlorination and chlorosulfonation reactions is enhanced because production of chlorinated by-products is reduced and entrainment of solvent and by-product in the polymer product is minimized. Further, the hazardous nature of polymer isolation from monofluorobenzene is reduced.

It has also been found that the use of monofluorobenzene as a solvent for chlorosulfonation reactions has further advantages. For example, it has been found that during chlorosulfonation reactions the efficiency of sulfur utilization is enhanced when monofluorobenzene is used as a solvent in comparison to carbon tetrachloride. Significant quantities of sulfur, for example above 2.5 weight percent, can only be incorporated into the olefin polymer at low temperatures in carbon tetrachloride and at these low temperatures precipitation of the polymer results. When monofluorobenzene is used, high levels of sulfur can be incorporated at high temperature, which provides a more efficient process. In addition, when monofluorobenzene is used as the reaction solvent, chlorination of the olefin polymer is homogeneous. That is, the chlorine distribution is more uniform along the polymer backbone than when carbon tetrachloride is used as a solvent. This results in the production of polymers having a lower crystallinity and glass transition temperature at a given chlorine content.

Monofluorobenzene of low water content is not readily available on a commercial scale. For the purposes of the present invention it may be produced by pre-treatment of the monofluorobenzene prior to introduction to the reactor or it may be generated in situ in the reactor. A variety of pre-treatment methods may be employed. Preferably the water is removed by distillation using a multiplate column. Alternative methods include contact with molecular sieves or passage through a silica gel column. One effective in situ method for removing water from the monofluorobenzene is the following. The monofluorobenzene is heated to vaporize monofluorobenzene/water azeotrope, boiling point approximately 72°–78° C. at atmospheric pressure, after which the azeotrope may be removed from the reactor as a forecut. After its formation, the azeotrope may also be introduced to a separate reservoir wherein it is contained and prevented from contacting the solution or suspension of polyolefin in anhydrous monofluorobenzene during the chlorination reaction. Other in situ methods include addition to the reactor of compounds which will react with water, for example thionyl chloride or phosgene. Combination of pre-treatment of the monofluorobenzene and in situ water removal are also contemplated by the present invention. This is a particularly useful embodiment because it results in elimination of any water which may be entrained in the olefin polymer base resin and introduced into the monofluorobenzene during dissolution of the polymer.

It is a particular feature of the present invention that electrophilic chlorination of the monofluorobenzene solvent is substantially reduced or eliminated. This is desirable because chlorinated solvent by-products, such as monochloromonofluorobenzene, are difficult to remove from the chlorinated olefin polymer products and, in addition, formation of solvent by-products necessitates the use of separation equipment for solvent recycle. Thus, the suppression of the formation of monochloromonofluorobenzene is a very important factor in achieving the benefits of the present invention. Reduced production of by-products, in particular monochloromonofluorobenzene, may be accomplished by adjusting several process parameters. First of all, water in the reaction mixture should be reduced to a low level.

Therefore, the monofluorobenzene used in the process contains less than 50 ppm water. It has been found that under such conditions, formation of chlorinated by-products, especially monochloromonofluorobenzene, is suppressed. In addition, under such conditions, formation of sulfuric acid, which causes product degradation and discoloration, is substantially eliminated.

The second step of the process of the present invention involves chlorination of olefin polymer in the presence of a free radical catalyst. Typical free radical catalysts include organic peroxides, organic hydroperoxides, or aliphatic azo compounds. Specific examples include 2,2'-azobis(2-methylpropane nitrile), benzoyl peroxide, diisopropylbenzene hydroperoxide, and a,a'-azobis(a,g-dimethylvaleronitrile). Use of mixtures of free radical catalysts are also contemplated by the invention. The amount of catalyst added will depend on the cycle time, which in turn depends on rate of chlorine addition, final chlorine content of the polymer, and size of the reactor. Generally, the initiator is introduced in amounts of 0.05–3% by weight of polymer present.

Auxiliary catalysts are often added to chlorosulfonation reactions of olefin polymers. These include amine compounds such as pyridine, quinoline, diazobicycloundecene, diazobicyclononane, and diazobicyclooctane. The purpose of the auxiliary catalyst is to facilitate incorporation of sultbnyl chloride groups onto the polymer backbone. A further advantage of the use of monofluorobenzene as a solvent is that, surprisingly, such additional catalysts are not necessary. That is, it is possible to produce polymers with high levels of sulfonyl chloride groups, up to 6 weight percent sulfur, in the absence of cocatalyst when monofluorobenzene is utilized as the reaction medium. This is of particular importance when polymers containing low levels of chlorine, i.e. 20–40 weight percent chlorine, and high levels of sulfur, i.e. 1.5–3.0 weight percent sulfur, are desired.

Chlorination of the olefin polymer is accomplished by passing elemental chlorine into the reaction solvent at temperatures of about 50°–150° C., preferably 80°–110° C. In addition, the reaction is preferably run at pressures of 0.10–0.35 MPa. The chlorinating agent is added either simultaneously with the addition of free radical catalyst or following the addition of free radical catalyst to the reactor. It is important that a sufficient amount of free radical catalyst be present during the entire reaction to suppress chlorination of the monofluorobenzene solvent. This can be accomplished by continuous addition of free radical catalyst simultaneously with the addition of the chlorinating agent. Alternatively, a sufficient level of free radical catalyst having a half-life such that active catalyst species are present throughout the duration of the chlorination reaction can be provided prior to introduction of the chlorinating agent. It is generally preferable to add the free radical catalyst continuously. Halflives for the free radical catalyst preferably range from 1 minute to 1 hour at temperatures of 80°–110° C.

Sufficient chlorinating agent is introduced to provide a polymer chlorine level as high as desired, up to the theoretical limit. In the case of polyethylene, this is approximately 70 weight percent chlorine. Generally, chlorine levels of at least 20 weight percent are desirable to provide products having good chemical resistance.

In a further embodiment, chlorosulfonyl cure sites may be introduced concurrently with polymer backbone chlorination by employing either sulfuryl chloride, a mixture of chlorine and sulfur dioxide, a mixture of chlorine and sulfuryl chloride, or a mixture of all three reagents as the chlorinating agent. In the case of chlorosulfonation, it is possible to incorporate up to 6 weight percent sulfur in the polyolefin. Preferably, polymers having sulfur contents of 1–3 weight percent are produced.

Chlorinated and chlorosulfonated products having chlorine levels of about 20 to about 45 weight percent chlorine find use as elastomers, adhesives and flexible coatings, while products having chlorine contents as high as 50–70 weight percent are useful as additives to coating and adhesive compositions to promote adhesion to wet surfaces and to promote chemical resistance. Products having chlorine levels below 20 weight percent are useful as flow modifiers and surface modifiers.

It has also been found that formation of monochloromonofluorobenzene and other chlorinated by-products of monofluorobenzene can be further suppressed by using pure sulfuryl chloride as the chlorinating or chlorosulfonating agent or employing combinations of chlorine and sulfuryl chloride wherein the ratio of sulfuryl chloride to chlorine is high. When the ratio of sulfuryl chloride to chlorine is low, for example, less than 0.1, chlorination of monofluorobenzene can be suppressed by proper adjustment of water level and free radical catalyst level. It has been found that when sulfuryl chloride is used as the sole chlorinating or chlorosulfonating agent, formation of monochloromonofluorobenzene is substantially eliminated.

When chlorinations or chlorosulfonations are performed according to the process of the present invention, chlorination of the monofluorobenzene reaction medium is reduced substantially. Generally levels of less than about 0.5 weight percent are produced in the reaction medium and a product generally containing less than 0.1 weight percent chlorinated monochloromonofluorobenzene is isolatable by extrusion.

Acid scavengers, for example epoxy-containing compounds, may be added to the polymer solution prior to isolation in order to further stabilize the chlorinated resin during the isolation process. Examples of suitable epoxy compounds include condensation products of diglycidylether and bisphenol A, condensation products of epichlorohydrin with diphenols, glycols, or glycerine, epoxidized monounsaturated alkanes, and epoxidized soybean oil. Preferably the epoxy stabilizer contains a phenoxy group. When an epoxidized alkane or soybean oil is employed it is preferable that it also contains a sterically hindered compound.

The third step of the process of the present invention involves the isolation of the chlorinated or chlorosulfonated polymer product from the monofluorobenzene solvent. Because of the flammability hazards associated with monofluorobenzene, the use of drum dryers, the preferable method of isolation of chlorinated and chlorosulfonated olefin polymers from solution, is unacceptably hazardous on a commercial scale. Generally, the use of extruders for isolation of chlorinated or chlorosulfonated olefin polymers has been an unacceptable alternative because the high temperature to which the polymers must be subjected in order to reduce solvent entrainment to an acceptable level results in product discoloration when the process is carried out at high rates. It has now, however, been found that in spite of the low vapor pressure and relatively high solubility of monofluorobenzene in chlorinated and chlorosulfonated polymers, it is possible to separate this solvent from the polymer products at temperatures low enough to produce low residual solvent levels with excellent color stability at high rates in an extruder process. This is accomplished by means of a particular extruder configuration. Specifically, it has been found that use of at least two extruders in series, with the first extruder having at least twice the cross sectional area of the second, allows isolation of heat sensitive polymers, such as chlorinated and chlorosulfonated olefin polymers, without excessive shear heating. Preferably, two extruders are used in series, one of which acts as a preconcentrator and which is generally vertically mounted.

According to the process of the invention, the polymer solution is introduced to the first extruder, substantially in the absence of oxygen. The extruder may be a single or double screw vented extruder which causes devolatilization of the product in a closed loop system. The screws may be intermeshing or non-intermeshing. Non-intermeshing screws are preferable for increasing throughput without thermally degrading the polymer. A faster screw speed is employed in this first extruder to give high free volume, which results in efficient vapor liquid separation without polymer entrainment. Generally, enough solvent is removed to produce a composition containing greater than 30 weight percent solids. Following the concentration step, the mixture is then introduced to a second extruder wherein the screw speed is lower than that of the first extruder. When more than two extruders are utilized in the isolation step of the process a slower screw speed is preferably used in each subsequent extruder. Extruder isolation also permits injection of carrier fluids, preferably water, carbon dioxide, or nitrogen to aid in removal of solvent. For example, addition of 2–5 weight percent water or nitrogen near the discharge end of the second of a series of two extruders, results in lowering of residual solvent in the polymer. The use of a closed loop system provides inherent process safety because contact of the polymer solvent mixture with oxygen is eliminated. In addition, the process is economically attractive because recovered solvent can be recycled. Because decomposition of the polymer is catalyzed by the presence of iron in steel and stainless steel, it is preferable that these substances do not contact the concentrated mixture during the extrusion operation. It is most preferable that the extruder be constructed of an alloy of nickel and chrome.

Chlorinated or chlorosulfonated olefin polymers prepared and isolated according to the provisions of the present invention contain less than 0.5 weight percent, generally less than 0.3 weight percent, combined residual monofluorobenzene and chlorinated by-products of monofluorobenzene, in particular monochloromonofluorobenzene. The polymers are not discolored and vulcanizates of the polymers do not exhibit significant losses of tensile strength compared to corresponding polymers prepared in carbon tetrachloride or aromatic solvents such as chlorobenzene. In fact, the tensile strengths of vulcanized polymers prepared according to the process of the present invention are substantially the same as those of corresponding compositions prepared in carbon tetrachloride. Substantially the same means, in this case, that the tensile strengths are within about 10% of the values of compositions prepared in carbon tetrachloride.

The invention is further illustrated by the following examples wherein all parts and percentages are by weight.

EXAMPLES

Example 1

A 113 liter, glass-lined autoclave equipped with a stirrer and a hastalloy overhead condenser is charged with 86 kg of monofluorobenzene containing less than 50 ppm water as a contaminant. Fifteen kilograms of polyethylene homopolymer having a density of 0.960 g/cc and a melt index of 5.2 g/10 minutes is added to the autoclave and it is pressurized to 26 psig (0.28 MPa) and then heated to 115° C. to dissolve the polyethylene. A free radical catalyst consisting of 2-methyl- 2,2'-azobispropanenitrile, at a concentration of 10 g/l in monofluorobenzene, is added at a rate of 5 ml/minute for 10 minutes prior to chlorine addition. Addition of the catalyst is continued at that rate throughout the reaction cycle. Chlorine gas is introduced at a rate of 2 kg/hour. Reaction temperature is maintained at 106°–109° C. for 15 minutes. During this period the shut-off valve in the condensate return line to the autoclave is closed to prevent the monofluorobenzene/water azeotrope which forms from contacting the autoclave contents. The loop-seal is drained twice during this period to check for the presence of azeotrope which is evidenced by cloudy solvent. A clear liquid indicates that the water/monofluorobenzene azeotrope has been removed from the reactor contents and the reaction mass is dry. The shut-off valve is opened and the temperature is reduced to 99°–102° C. Sulfuryl chloride is then s introduced at a rate of 12 kg/hour while chlorine gas flow was maintained at 3 kg/hour until 18 kg sulfuryl chloride had been added. An additional 1.2 kg chlorine gas is introduced while the system temperature is increased to 109° C. Hydrogen chloride and sulfur dioxide by-products are removed by decreasing the autoclave pressure to atmospheric, thereby reducing the system temperature to 85° C. After removal of the acidic by-products, 0.35 kg of a condensation product of epichlorohydrin and bisphenol A, having an equivalent weight of 180, is added to the reaction mixture as a stabilizer for the chlorosulfonated polyethylene product. The final stabilized product contains approximately 35 wt.% combined chlorine and 1.0 wt.% combined sulfur. The polymer solution is removed from the reactor to a hold tank from which it is pumped with a gear pump through a leaf type solution filter. The filter and transfer lines are insulated in order to maintain the solution at a temperature above 50° C. The solution is passed through a flow meter and automatic valve to maintain a constant flow rate and through a preheater which raises the temperature of the solution to greater than 90° C. and approximately 30 psig pressure (0.31 MPa). The solution is then introduced to a vertically mounted 70 mm counter rotating non-intermeshing twin screw preconcentrating extruder having L/D of 16:1 at a feed port located approximately at the midpoint of the barrel section. The extruder is equipped with a vent port operated at approximately 5 psig (0.14 MPa) which is located above the feed point and through which at least half the solvent present in the feed solution is removed in vapor form. The extruder is operated at 200 rpm and the barrel is maintained at 130° C. The preconcentrating extruder is mounted atop and perpendicular to a devolatilizing extruder. The drive of the preconcentrating extruder is fitted with a nitrogen chamber where a slight continuous flow of nitrogen is forced through the drive shaft seals. The devolatilizing extruder is a counter rotating, non-intermeshing twin screw extruder with an L/D ratio of greater than 40. The feed point is at least 12 diameters downstream of the drive end, which is also fitted with a nitrogen chamber. Approximately 50% of the remaining solvent in the product stream entering the extruder is removed in vapor form via a rear vent port, operated at atmospheric pressure, located between the feed point and the drive end. The remaining solvent is removed in stages of progressively lower pressure through three downstream vent ports with absolute pressure equal to one-half or less of the absolute pressure in the previous vent. The barrel is heated to a temperature of 150° C in the first half of the devolatilizing extruder and the temperature of the second half is adjusted to maintain the discharge temperature of the polymer at less than 180° C. The devolatilizer screw is operated at 100 rpm, approximately one-half that of the speed of the preconcentrating extruder. The extruded product is nondegraded and has a color equal to that of the feed solution and contains less than 0.5% residual monofluorobenzene and chlorinated by-products of mono fluorobenzene.

Example 2

The procedure of Example 1 is repeated with the following modifications. No sulfuryl chloride is used and the rate of addition of chlorine gas is increased to achieve a 35% chlorine level in the polymer. In addition, the temperature of dissolution of the polyethylene is 110° C., the concentration of free radical catalyst in monofluorobenzene is 1%, and the catalyst solution is added continuously at a rate of 5 cc/minute. Reaction temperature is maintained at 106°–110° C. and chlorine gas is added at a rate of 4 kg/hour until a total of 18 kg has been added. In this manner 15 kg of linear polyethylene, having a melt index of 5.2 g/10 minutes, is chlorinated to a level of 35%. The chlorinated polyethylene product is isolated from solution using the series of extruders described in Example 1 to yield a product having less than 0.5% monofluorobenzene solvent and chlorinated by-products of monofluorobenzene.

We claim:

1. A process for preparation of chlorinated olefin polymers having low residual solvent content which comprises (a) forming a solution or .suspension of an olefin polymer in a solvent consisting essentially of monofluorobenzene having a water content of less than 50 ppm, by bringing together the olefin polymer, a free radical catalyst, the monofluorobenzene, and a chlorinating agent selected from the group consisting of chlorine, sulfuryl chloride, a mixture of chlorine and sulfur dioxide, and mixtures thereof, the water content of the monofluorobenzene being reduced to less than 50 ppm i) prior to introduction to the reactor or ii) in situ, with the proviso that the chlorinating agent is introduced simultaneously with the addition of the free radical catalyst or following addition of the free radical catalyst;

(b) chlorinating the olefin polymer to a level of up to 70 percent chlorine by weight while maintaining a level of free radical catalyst sufficient to suppress chlorination of the monofluorobenzene; and (c) separating the chlorinated olefin polymer and solvent, one from the other, substantially in the absence of oxygen, by means of a series of two or more vented closed-loop extruders, the first extruder having at least twice the cross sectional area of the second;

thereby producing a non-discolored chlorinated olefin polymer having a total residual level of combined monofluorobenzene and chlorinated by-products of monofluorobenzene of less than 0.5 percent by weight.

2. The process of claim 1 wherein the chlorinating agent is a chlorosulfonating agent.

3. The process of claim 1 wherein the chlorinating agent is chlorine.

4. The process of claim 2 wherein the chlorosulfonating agent is sulfuryl chloride.

5. The process of claim 1 wherein the olefin polymer is selected from the group consisting of homopolymers of $C_2$–$C_3$ alpha monoolefins, copolymers of ethylene and carbon monoxide, and copolymers of ethylene and at least one ethylenically unsaturated monomer selected from the group consisting of $C_3$–$C_{10}$ alpha monoolefins, $C_1$–$C_{12}$ alkyl esters of unsaturated $C_3$–$C_{20}$ monocarboxylic acids, unsaturated $C_3$–$C_{20}$ mono-or dicarboxylic acids, anhydrides of unsaturated $C_4$–$C_8$ dicarboxylic acids, and vinyl esters of saturated $C_2$–$C_{18}$ carboxylic acids.

6. The process of claim 5 wherein the olefin polymer is polyethylene.

7. The process of claim 5 wherein the olefin polymer is a copolymer of ethylene and octene.

8. The process of claim 1 wherein the olefin polymer is chlorinated to a level of 20–70 weight percent chlorine.

9. The process of claim 8 wherein the chlorinated olefin polymer has a sulfur level of up to 6 percent by weight.

10. The process of claim 9 wherein the chlorinated olefin polymer has a sulfur level of 1–3 percent by weight.

11. The process of claim 1 wherein the olefin polymer is chlorinated to a level of 50–70 weight percent chlorine.

12. The process of claim 1 wherein the free radical catalyst is added continuously throughout step (b).

13. The process of claim 1 wherein the series of extruders consists of two extruders.

14. The process of claim 1 wherein the screw speed of each subsequent extruder in the series is less than that of the preceding extruder in the series.

15. The process of claim 1 wherein at least one extruder is a non-intermeshing screw extruder.

16. The process of claim 1 wherein the material of construction of the extruder is a nickel chrome alloy.

17. The process of claim lwherein the total residual level of monofluorobenzene and monochloromonofluorobenzene is less than 0.3 weight percent.

* * * * *